United States Patent
Falch et al.

(10) Patent No.: US 7,313,689 B2
(45) Date of Patent: Dec. 25, 2007

(54) METHOD, SYSTEM AND SERVICE FOR THE AUTHENTICATION OF A PUBLIC KEY CERTIFICATE

(75) Inventors: Konrad Falch, Sandnes (NO); Trond Lemberg, Skotbu (NO); Håkon Liberg, Oslo (NO); Anund Lie, Olso (NO); Per Myrseth, Oslo (NO); Jon Olnes, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 10/549,001

(22) PCT Filed: Apr. 5, 2004

(86) PCT No.: PCT/GB2004/001484

§ 371 (c)(1),
(2), (4) Date: Sep. 14, 2005

(87) PCT Pub. No.: WO2004/091134

PCT Pub. Date: Oct. 21, 2004

(65) Prior Publication Data

US 2006/0174122 A1   Aug. 3, 2006

(30) Foreign Application Priority Data

Apr. 7, 2003 (NO) .................................. 20031568

(51) Int. Cl.
*H04L 29/00* (2006.01)
*H04L 29/06* (2006.01)
*H04L 9/00* (2006.01)

(52) U.S. Cl. ...................... 713/155; 713/156; 713/157; 713/171; 713/175; 380/277; 380/282; 705/71

(58) Field of Classification Search .................. None
See application file for complete search history.

(56) References Cited

U.S. PATENT DOCUMENTS

| 4,868,877 | A | * | 9/1989 | Fischer | 713/157 |
| 6,108,788 | A | | 8/2000 | Moses et al. | |
| 6,304,974 | B1 | * | 10/2001 | Samar | 726/10 |
| 6,792,531 | B2 | * | 9/2004 | Heiden et al. | 713/158 |

(Continued)

FOREIGN PATENT DOCUMENTS

WO    WO 98/26385    6/1998

*Primary Examiner*—Syed A. Zia
*Assistant Examiner*—Trang Doan
(74) *Attorney, Agent, or Firm*—Schmeiser, Olsen & Watts; William H. Steinberg

(57) ABSTRACT

A method, system, and service of authenticating a public key certificate for a relying party (RP). A Certificate Authority (CA), who issued the certificate, is a member of a Public Key Infrastructure (PKI) having a Certificate Policy (CP). First quality levels required of the CA by the RP are accessed by a certificate classification service (CCS) and corresponding second quality levels possessed by the CA are ascertained by the CCS. At least one quality characteristic pertaining to the second quality levels relates to at least one element of the CP. The ascertained second quality levels are compared by the CCS with the corresponding accessed first quality levels. A result of the comparing, communicated by the CCS to the RP, is that the certificate is authenticated if the comparing has determined that each first quality level is not less than each corresponding second quality level.

15 Claims, 1 Drawing Sheet

U.S. PATENT DOCUMENTS

| | | |
|---|---|---|
| 6,853,988 B1 * | 2/2005 | Dickinson et al. ............ 705/75 |
| 6,892,307 B1 * | 5/2005 | Wood et al. .................... 726/8 |
| 7,047,409 B1 * | 5/2006 | Aull et al. .................. 713/173 |
| 2002/0062438 A1 * | 5/2002 | Asay et al. .................. 713/157 |
| 2002/0156747 A1 | 10/2002 | Reiter et al. |

* cited by examiner

METHOD, SYSTEM AND SERVICE FOR THE AUTHENTICATION OF A PUBLIC KEY CERTIFICATE

FIELD OF THE INVENTION

The invention relates to security mechanisms for electronic transactions; specifically use of public key cryptography for authentication and electronic (digital) signatures, and determination of the quality level of such authentication and signature procedures.

TECHNICAL BACKGROUND

Authentication (proof of identity) is crucial to many applications and services in the electronic world. Today, this is mainly accomplished is by username and password. A password is an inherently weak mechanism. Furthermore, passwords (same applies to other mechanisms based on shared secrets) should be different for different mechanisms requiring password authentication. The situation quickly becomes cumbersome, as a user today will commonly have in the range of 20 usernames and password for different services on the Internet. The number of usernames and passwords is expected to grow, as the number of services offered on the Internet increases.

Electronic IDs based on public key cryptography and certificates issued by a trusted Certificate Authority (CA) offer an alternative approach. A certificate binds a name to a public key. Since this information is open, the electronic ID may be used towards any counterpart, potentially replacing all usernames and passwords for the ID holder. Public key cryptography offers the added functionality of electronic signatures on documents (non-repudiation), and establishment of secure communication channels (confidentiality and integrity). An electronic ID will consist of 1-3 certificates and corresponding key pairs (public keys in certificates and private keys held by the owner of the electronic ID) depending on the need for different keys and certificates for different usage (signature, encryption, authentication). Note that an electronic ID in principle may be issued to any subject that can be given a name: persons (real name or pseudonym), organisations and organisational units, roles, computers, services, network addresses, and so on.

A Public Key Infrastructure (PKI) consists of one CA, or several CAs in a common system. A PKI may be anything from a simple system serving one organisation to a community service issuing the electronic parallel of official, physical ID cards.

Even when limiting the scope to the latter (public PKIs), there are several hundred PKIs world wide, with more to come with an increasing focus on electronic IDs and electronic signatures as enablers of electronic commerce. This poses problems to the entity that receives an electronic ID, the Relying Party (RP). The main problems are:

Semantic interpretation (syntax is usually not a problem) of certificate content as specified by different CAs, and in particular interpretation of subject names.

Safe management of the public keys of the CAs, used to verify the CAs' electronic signatures on certificates.

Revocation checking, i.e. verifying that the certificate is not on the issuing CA's list of certificates that are declared invalid before their normal expiry time.

Determination of the quality of the certificate—electronic IDs may have widely different quality characteristics.

This invention focuses on the latter problem: determination of the quality level of a given certificate. Determination of the quality of a certificate that is about to be accepted is a part of the risk management procedures of the RP. The strength of the authentication procedure is an important parameter when deciding upon the access rights to grant to an authenticated counterpart. Username and password may be enough only for a minimal level of authorisations, given the risk that an attacker has spoofed the authentication. A weak electronic ID may be comparable to a password in strength, while a strong electronic ID may give full access to all services.

When the electronic ID is used to sign a document, which may be a valuable contract, the issue of whether or not the electronic ID has the necessary quality may be even more important.

Today, quality classification is almost entirely up to the RP. Several products offer the possibility of configuring the quality level of an authentication mechanism. As one example, Netegrity's SiteMinder product uses a scale from 1-100. However, the RP must itself determine which number an electronic ID (or other mechanism) shall take, and configure this in the authentication server. The classification, in SiteMinder as well as similar products, is just a number, not revealing more detailed information about the electronic ID.

With respect to more objective classification of electronic IDs, the most important term is "qualified certificate" as defined by the EU Directive on electronic signatures [5]. In the US, the "Federal Bridge" CA has defined some distinct levels that a CA may select when cross-certifying towards the Federal Bridge. ETSI's recommendation [4] for issuers of "non-qualified" certificates also makes an attempt at defining the main parameters that characterises the quality of a certificate. A "qualified certificate" can only be issued if the CA fulfils all the requirements stated in EU and national legislation. However, the term has little value outside the EU. Few CAs have today cross-certified with the Federal Bridge, and such cross-certification has little value outside of the US. ETSI's non-qualified recommendation is rarely used today.

Given the state-of-the-art, the invention provides a novel approach at relieving the RP from the burden of performing quality classification for individual CAs, at the same time facilitating the RP's risk management.

DISCLOSURE OF THE INVENTION

The invention provides a method and a service for comparison of quality characteristics of certificates towards the requirements of RPs. A CA and its service are classified according to certain criteria. An RP's requirements are specified according to the same criteria. The invention provides an arrangement for comparison of certificate classifications and RP requirements, and in particular suggests use of a certificate classification service to implement the arrangement.

The classification scheme is not specified by the invention, and can range from merely one overall value (e.g. 1-10 with increasing quality) to a detailed breakdown of the CA's service into quality components with assigned values.

The invention relieves an RP from the burden of determining the quality of different electronic IDs (certificates) itself. Thus, the invention assists the RP in its risk management decisions, related to the required quality of electronic IDs that shall be accepted for business critical and other purposes. The invention makes it possible for an RP to accept a certificate from a CA that is previously unknown to the RP, provided the CA and its certificates have been classified according to the relevant criteria.

A relying party may define several quality profiles, for operations with different risk management requirements. A service based on the invention may serve several relying parties with different quality requirements.

Viewed from a first aspect the invention provides a method for the authentication of a public key certificate by a relying party that must decide upon trust in the certificate, characterised in that the method comprises the following steps: performing an assessment of the quality of the certificate and the Certificate Authority that has issued the certificate according to well-defined criteria; describing the quality requirements of the relying party according to the same well-defined criteria; comparing the quality assessment and the relying party's quality requirements; and if the quality of the certificate is equal to or exceeds said quality requirements, authenticating said certificate.

Preferably the present invention provides a method as claimed in claim 1, wherein the comparison is performed by the relaying party.

Preferably the present invention provides for the comparison to be performed in a certificate classification service.

Viewed from a second aspect the present invention provides a method for the authentication of a public key certificate for a relying party that must decide upon trust in the certificate: characterised in that, the method comprises the following steps: sending a request for authentication of the certificate to a certificate classification service; the service performing an assessment of the quality of the certificate and the Certificate Authority that has issued the certificate according to well-defined criteria; describing the quality requirements of the relying party according to the same criteria; comparing the said quality assessment and the relying party's quality requirements; and returning an indication of the result of said comparison to the relying party.

Preferably the present invention provides a method wherein the indication is returned as a list of deviations between the certificate quality and the relaying party's quality requirements.

Preferably the present invention provides for the indication to be returned as a yes/no answer.

Preferably the present invention provides a method wherein in the assessment of the quality of the certificate is performed on data made available for said service in real time on request.

Preferably the present invention provides a method wherein the description of the quality requirements of the relying party is made available for said service in real time on request.

Preferably the present invention provides a method wherein the result of the assessment of the quality of the certificate is stored in a certificate profile register for later retrieval.

Preferably the present invention provides a method wherein the description of the quality requirements of the relying party is stored in a relying party profile register for later retrieval.

Viewed from a third aspect the present invention provides a service for the authentication of a public key certificate, characterised wherein means for retrieving data from a Certificate Authority that has issued said certificate and performing an assessment of the quality of the certificate and the Certificate Authority according to well-defined criteria; means for retrieving data from a relying party and describe the quality requirements of the relying party according to the same criteria; means for comparing said quality assessment and the relying party's quality requirements, and means for sending an indication of the result of said comparison to the relying party.

Viewed from a fourth aspect the present invention provides a service for the authentication of a public key certificate, characterised wherein in the service further comprises: means for storing the result of said assessment in a certificate profile register; and means for storing said description of the quality requirements of the relying party in a relying party profile register.

Viewed from a fifth aspect the present invention provides a computer program product loadable into the internal memory of a digital computer, comprising software code portions for performing, when said product is run on a computer, to carry out the invention as described above.

BRIEF DESCRIPTION OF THE DRAWING

Embodiments of the invention are described below in detail, by way of example only, with reference to the accompanying drawings in which.

DETAILED DESCRIPTION OF THE INVENTION

Figure 1:
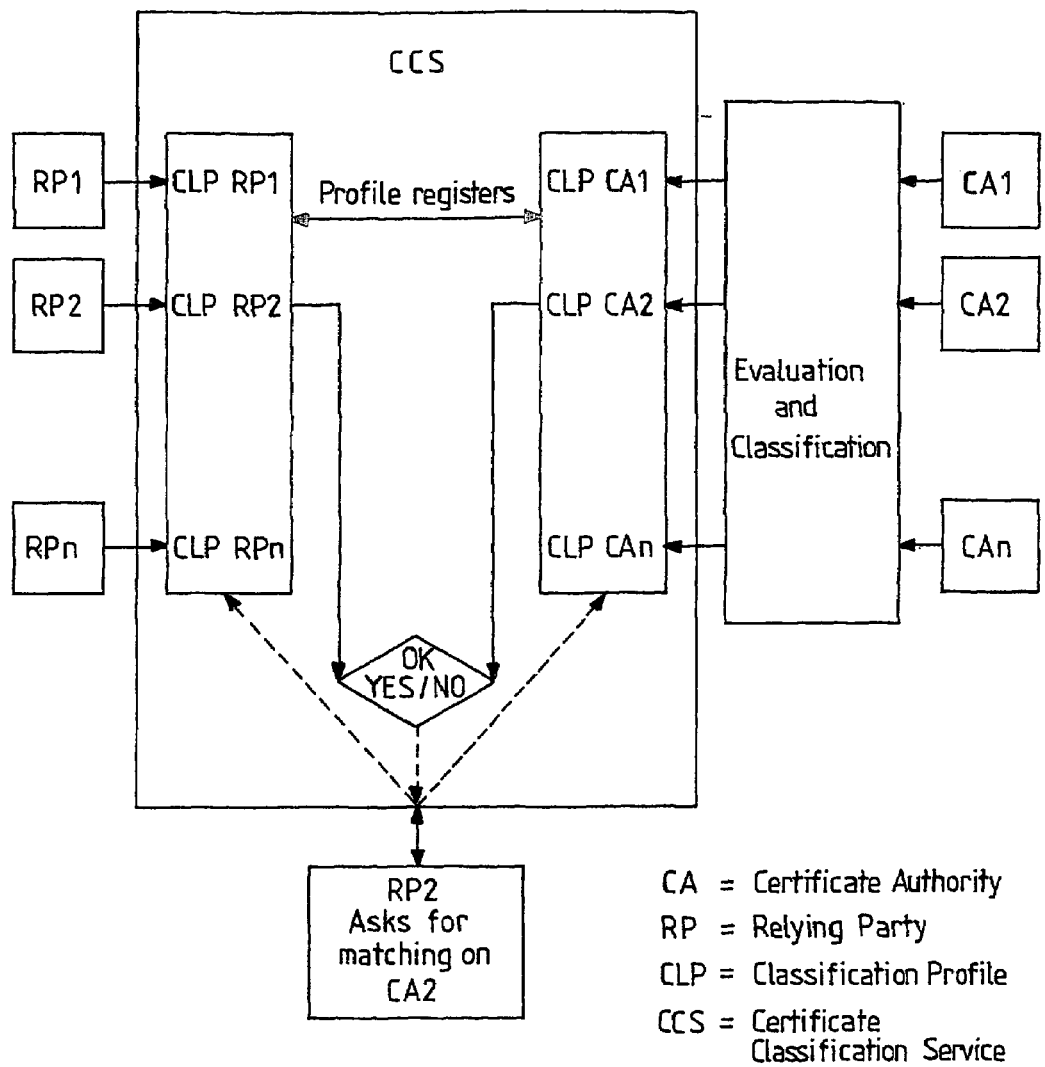
FIG. 1 shows a component diagram detailing the interactions between the different components of the present invention.

The invention will now be described in detail in reference to the appended FIG. 1.

In the scenario shown in FIG. 1, Relying Party RP2 has received a signed document, where a certificate issued by CA2 must be used to validate the signature. RP2 has no knowledge of CA2's quality level. To decide on the applicability of the certificate, RP2 queries the certificate classification service and waits for a reply stating yes or no.

In the query, RP2 refers to a named policy profile registered for RP2 with the certificate classification service. Matching is done towards a pre-configured quality profile of CA2's service. The answer is "yes" or "no" dependent on whether the profiles match or not.

While this is the primary response model offered by the invention, other interaction scenarios and responses are possible, as described in section.

EXAMPLE

The main problem to an RP is: "Can I trust the presented certificate?" An example may illustrate this: A person accesses an e-merchant (the RP) to buy something. The buyer electronically signs an order using a certificate issued by the Certificate Authority CA1. The e-merchant has no relation to CA1, and instead has its certificate from CA2. The two CAs (CA1/CA2) have no bilateral agreement, like cross-certification, on certificate quality. The two CAs may have different certificate policies concerning technical security, financial guarantees etc., and they may operate under different legislations. For the actual transaction, however, the RP may still accept certificates issued by CA1 if it can evaluate CA1's quality of service and determine that this is sufficient for the purpose at hand. This may be accomplished by use of a "certificate classification service", as suggested by this document.

If CA1's service is pre-classified, and RP's demands are pre-defined in terms of the same model, quality of service and demands can be compared, and a decision to trust or not trust the certificate can be taken on the fly. RP's demands may be matched not only against CA1's service, but also against any CA configured in the certificate classification service.

Quality Classification of a CA's Service

Based primarily on the information sources described in this section, a generalised classification schema for certificates can be defined. The classification scheme is not specified by the invention, and can range from merely one overall value (e.g. 1-10 with increasing quality) to a detailed breakdown of the CA's service into quality components with assigned values. Most parameters will yield (fairly) static information but one may also include information that to some extent varies over time, credit rating being one example. Actual classification should preferably be done by an evaluator that is highly trusted for such purposes, such as Det Norske Veritas (DnV).

Most quality characteristics of a CA[1] are reflected in its Certificate Policy (CP). All public CAs are expected to publish their CPs, while intra-organisational CAs and the like may be run without defined CPs. Today's CAs operate according to highly different CPs, and thus have highly different quality characteristics. Usually, the two most important quality parameters are the assurance level with respect to the authenticity of the certificate (the CA's procedures to guard against acceptance of a faked request for certificates, resulting in a fake electronic ID), and the assurance-level with respect to misuse of the certificate (e.g. guarding against production of a faked signature). However, there are also other important factors that affect the trust in a given certificate, such as financial guarantees and responsibilities related to (mis-)use of a certificate.

[1] In the following, this document uses the term CA. If all CAs in a PKI have the same quality characteristics, e.g. using the same certificate policy, then the text will apply to the whole PKI, A full classification of a CA's quality must consider all elements that define the PKI that the CA is a member of (may be only the CA itself). These are:

- The Certificate Policy (CP), which is the main document with respect to quality of service and other characteristics.
- Certification Practice Statement (CPS) describes how the requirements of the CP are met in practice. A CPS may refer to internal documents, e.g. with respect to the security of the CA installation. A CP may be more or less detailed, which may require a CPS that is less or more detailed. Some CAs do not separate the description in two documents but use a common CP/CPS document.
- Trust model defines how a CA relates to other CAs, within the same PKI or in other PKIs, e.g. membership in hierarchies or in cross-certification arrangements.
- Formal agreements that regulate the relationships between the CA and other actors, in particular the CA's customers (that it issues certificates for), but also actors like (some) RPs, Registration Authorities (RA) used by the CA, other CAs (see previous bullet point) etc. The CP should cover most or all these issues but explicit agreements are convenient.
- Certificate format (profile), and in particular naming. CRL (Certificate Revocation List) profile must also be defined if CRLs are used.
- Directories and other means for information distribution.

While the CA's service as described by the elements above is the main topic of the classification, the actor that is responsible for the CA is also of interest per se. As one example, a statement of liability in case of errors may have little value if the economic situation of the actor in charge is that it may go bankrupt if the liability is claimed. The customer base and market penetration of the CA may be important, as two parameters that describe the chances that the CA will survive over time. One may say that not only the CA service, but also the actor behind it, should be trusted.

With respect to CPs, a few standard formats are defined, and most CAs follow one of these. The normal case is a structure according to RFC2527 [2]. In Europe, ETSI has defined a CP framework [3] that is recommended for a CA that issues "qualified certificates" according to the EU Directive on electronic signatures [5]. ETSI's document defines a mapping towards RFC2527. The term "qualified certificate" also defines a distinct level that of course is very important with respect to certificate classification. ETSI also has a recommendation [4] for issuers of "non-qualified" certificates. In the US, the policy recommendations of the "Federal Bridge" [11] should be taken into account, as these define certain quality levels for cross-certification towards the bridge, and thus may feed into the classification scheme. ABA (American Bar Association) also has recommendations for CPs.

A CP should have the following contents, according to RFC2527 [2]:

- Allowed or intended application areas for the certificates.
- Liabilities and responsibilities of different actors (notably the CA, the customers, the RPs, and RAs), legal environment and jurisdiction, privacy statements, possibly also economical conditions.
- Internal control mechanisms or (preferably) third party audit procedures to verify that the CA operation is in accordance with CP, CPS and internal procedure descriptions.
- Requirements and/or procedures for identification and authentication in connection with certificate issuing, naming, and procedures and rules for (application for) certificate revocation.
- Operational requirements for certificate issuing, revocation, logging procedures, archival, key management (in particular key rollover) for the CA itself, etc.
- Requirements for publishing (directory services etc.) for certificates, CRLs, and other information.
- Disaster recovery plans for the CA, and procedures for termination of the service or transfer of the service to another operator.
- Physical, logical, and administrative security related to operation of the service, including requirements for equipment and operators.
- Technical security measures related to treatment (lifecycle from generation to destruction) of private and public keys, including requirements for storage of private keys.
- Parts of the profiles for certificates and CRLs.
- Responsibility and procedures for maintenance of the CP itself, and for publication of changes.

As stated above, the most important aspects of the quality of a CA are the precautions against fake certificates, and the precautions against misuse of private keys. The risk that someone can have a false request for certificates accepted by the CA can be evaluated against the requirements for identification and authentication of applicants, and the operational procedures involved. Misuse of private keys cannot be entirely controlled by a CA, but requirements for storage of private keys, in particular use of smart cards or other hardware, contribute strongly to reducing the risk.

Compliance with Claimed Quality Level

The CP represents (the main parts of) the real quality level of the CA only if all procedures (CP, CPS and internal procedures) are actually followed. Thus, certificate classification also has to evaluate the assurance level related to compliance between CP and actual operation, notably:

Statement of compliance made by the CA itself.

Third party audit reports (many CPs demand third party audits).

Surveillance authorities entitled to check the CA's operation. This is required in most countries for CAs issuing "qualified certificates" according to the EU Directive on electronic signatures [5].

Information about hierarchies and cross-certification regimes that the CA is part of, and requirements posed by other parties in such arrangements.

Certificates such as BS7799 [1], ISO9000, and ISO15408 [7] for organisation, equipment or systems.

Quality of Service and Risk Management

An RP's decision to trust or not, for a particular purpose, a given certificate is in fact a risk management decision. This may well be the most crucial part of the RP's decision to accept the transaction that is about to done. The risks are in particular related to acceptance of a fake certificate (e.g. issued to another person than the one named in the certificate) or a faked signature, but also to the RP's possibilities to follow suit in case of these or other events.

A certificate policy is a textual document. The certificate classification will transform this, and other quality parameters as discussed above, to a representation that is fit for comparison. Correspondingly, an RP will describe its requirements in the same "language". An RP may define one or more such policy profiles, suitable for transactions with different risk management demands.

In the simplest case, the classification scheme may be just a grading (say, 1-10), where an RP's requirement may be stated as "5 or higher". Such grading of strength of authentication mechanisms, including strength of different certificate services, is a functionality offered today by some authentication products. However, the RP must decide on the grading, e.g. by determining the quality of a CA's CP. This implies that only known CAs, configured in the RP's own authentication system, can be handled. Also, most CPs are fairly hard to read due to both technical and legal content, and most RPs will lack the competence needed for a thorough analysis of a CP.

The certificate classification arrangement described in this document offers much more fine-grained analysis of different quality characteristics. Particular quality aspects are analysed individually, to be matched against particular RP requirements. Also, the classification may be performed by a service provider, thus relieving the RP of the burden of analysing CPs. The quality profile determined for a CA can of course be reused across different RPs.

With the certificate classification service, one may also define policy profiles with more "relaxed" requirements, e.g. stating a desired level but accepting some deviations from these requirements on at least some characteristics.

The benefit of using such a classification system is that an RP can get an immediate recommendation about trust or not in a certificate issued by a CA that is "unknown" to the RP.

Note that the answer from the certificate classification service should in principle be treated as a recommendation. Trust is a subjective property, and trust decisions will be taken independently by different RPs. A certificate classification service describes quality, not trust (quality being only one aspect that supports trust decisions). A certificate classification service can only judge about the RP's trust decisions to the degree that these are reflected in the RP's defined policy profiles. In practice, however, one must expect that an RP more often than not will automatically follow the recommendations of the certificate classification service.

Functional Description

Primary Response Model

In the scenario shown in FIG. 1, Relying Party RP2 has received a signed document, where a certificate issued by CA2 must be used to validate the signature. RP2 has no knowledge of CA2's quality level. To decide on the applicability of the certificate, RP2 queries the certificate classification service and gets back a yes or no answer.

In the query, RP2 refers to a named policy profile registered for RP2 with the certificate classification service. Matching is done towards a pre-configured quality profile of CA2's service. The answer is "yes" or "no" dependent on whether the profiles match (i.e. CA2's quality level is (more than) sufficient) or not.

Alternative Response Models

The certificate classification service is not restricted to the mode of operation shown in FIG. 1. The characteristic property of the service is that it matches certificate quality with RP requirements, not the use of any particular protocol or response model. Examples of alternative response models are:

The RP passes its policy profile to the certificate classification service at the time of calling instead of pre-registering profile(s).

The certificate classification service returns the certificate's quality profile to the RP, which performs the matching towards policy requirements locally.

Deviations between the certificate quality and the RP's policy requirements are returned to the RP, not only yes/no answers.

All these models depend upon advance registration of the CA's quality profile in the certificate classification service. It is also possible to pass a CA quality profile as a parameter to the certificate classification service at the time of calling.

Communication

The description does not mandate any particular protocol or other means of communication towards the certificate classification service. However, note that the certificate classification service may be combined with a certificate validation service, which can handle more aspects of certificate processing on behalf of the RP, such as:

The validity of the certificate with respect to revocation and expiry.

Processing of certificate syntax and semantics, given that the complete certificate is passed to the validation service.

Check of validity of the CA's signing key, and of the CA's signature on the certificate (the latter depends on access to the complete certificate).

Translation of information in a certificate to auxiliary information, notably deriving other names (username, social security number and so on) securely from names in the certificate.

Such a validation service can replace complicated technologies such as cross-certification, bridges, and hierarchies of CAs. Access to the policy classification service may then be "piggybacked" onto a standard protocol for certificate validation, such as XKMS (XKISS) [6], OCSP [9] [10], SCVP [8], or CVP [12].

REFERENCES

[1] British Standard: "Information security management—Part 1: Code of practice for information security management", British Standard BS7799-1:1999, 1999.
[2] S. Chokani, W. Ford: "Internet X.509 Public Key Infrastructure Certificate Policy and Certification Practices Framework", RFC2527, March 1999.
[3] ETSI: "Policy Requirements for Certification Authorities Issuing Qualified Certificates", ETSI TS 101 456 v1.2.1, April 2002.
[4] ETSI: "Policy Requirements for Certification Authorities Issuing Public Key Certificates", ETSI Technical Standard TS 102 042 v1.1.1, April 2002.
[5] EU: "Community Framework for Electronic Signatures", Directive 1999/93/EC of the European Parliament and of the Council, December 1999.
[6] W. Ford, P. Hallam-Baker, B. Fox, B. Dillaway, B. LaMacchia, J. Epstein, J. Lapp: "XML key management specification (XKMS)", W3C Note, March 2001
[7] ISO/IEC: "Evaluation criteria for IT security", ISO/IEC IS15408 parts 1-3, 1999.
[8] A. Malpani, R. Housley, T. Freeman: "Simple certificate validation protocol", Internet draft, December 2002.
[9] M. Myers, R. Ankney, A. Malpani, S. Galperin, C. Adams: "Internet X.509 public key infrastructure online certificate status protocol", RFC2560, June 1999.
[10] M. Myers, A. Malpani, D. Pinkas: "Internet X.509 public key infrastructure online certificate status protocol, version 2", Internet-draft, December 2002.
[11] NIST: "X.509 Certificate Policy for the Federal Bridge Certification Authority (FBCA), Version 1.12", National Institute of Standards and Technology (NIST), December 2000.
[12] D. Pinkas: "Certificate validation protocol", Internet-draft, January 2003.

The invention claimed is:

1. A method for authentication of a public key certificate as a service to a relying party (RP) in response to a request for said authentication by the RP who desires to determine a level of trust in a Certificate Authority (CA) that issued the certificate, said method comprising:

accessing a first quality level of each quality characteristic of a first set of quality characteristics required of the CA by the RP, said CA being a member of a Public Key Infrastructure (PKI) having a Certificate Policy (CP);

ascertaining a second quality level of each quality characteristic of a second set of quality characteristics possessed by the CA, each ascertained quality characteristic of the second set corresponding to an accessed quality characteristic of the first set on a one-to-one basis, at least one quality characteristic of the second set relating to at least one element of the CP;

comparing the ascertained second quality level of each quality characteristic of the second set with the accessed quality level of each corresponding quality characteristic of the first set; and communicating a first result of said comparing to the RP, said first result being that the certificate is authenticated if said comparing has determined that each first quality level is not less than each corresponding second quality level, otherwise said first result being that the certificate is not authenticated, said accessing, ascertaining, comparing, and communicating being performed by a certificate classification service;

wherein the second quality level of the quality characteristics of the second set comprise an assurance level with respect to an authenticity of the certificate, an assurance level with respect to guarding against a fake signature on the certificate, a credit rating of the CA, and parameters relating to; a Certification Practice Statement (CPS) describing how the requirements of the CP are met in practice: a trust model defining how the CA relates to other CAs within the PKI that the CA is a member of and to CAs who are members of other PKIs; formal agreements that regulate relationships between the CA and other actors such that the other actors include customers of the CA for whom the CA issues certificates, Registration Authorities (RA) used by the CA, and at least one other CA; and use of a Certificate Revocation List (CRL); and wherein the at least one element of the CP to which the at least one quality characteristic of the second set is related comprises: allowed or intended application areas for certificates issued by the CA; liabilities and responsibilities of the CA and of the customers of the CA; a legal environment and jurisdiction in which the CA operates; privacy statements used by the CA; economical conditions pertaining to the CA; internal control mechanisms or third party audit procedures to verify that the CA's operation is in accordance with the CP, the CPS, and internal procedure descriptions; requirements and procedures for identification and authentication in connection with certificate issuing and naming by the CA; requirements and procedures and rules for certificate revocation by the CA; operational requirements for certificate issuing, revocation, logging procedures, archival, and key management by the CA; requirements for publishing for certificates, CRLs, and other information; disaster recovery plans for the CA; procedures for termination of the CA's service or transfer of the CA's service to another CA; physical, logical, and administrative security related to operation of the CA's service; technical security measures used by the CA relating to generation, storage, and destruction of private keys and public keys; and an extent of compliance of the CA with the at least one element of the CP.

2. The method of claim 1, wherein said conmunicating further comprises communicating a second result of said comparing to the RP, wherein the second result is a list of deviations between the determined second quality level of each quality characteristic of the second and the accessed quality level of each corresponding quality characteristic of the first set.

3. The method of claim 1, wherein said accessing comprises obtaining the first quality level of each quality characteristic of the first set of quality characteristics from a certificate profile register of the certificate classification service.

4. The method of claim 1, wherein said accessing comprises receiving the first quality level of each quality characteristic of the first set of quality characteristics from the RP in conjunction with said request.

5. The method of claim 1, wherein the second set of quality characteristics is stored in a certificate profile register of the certificate classification service prior to said ascertaining.

6. The method of claim 1, wherein the accessing, ascertaining, comparing, and communicating are performed by the certificate classification service by executing software code on a computer.

7. A system for authentication of a public key certificate as a service to a relying party (RP) in response to a request for said authentication by the RP who desires to determine a level of trust in a Certificate Authority (CA) that issued the certificate, said system comprising:

means for accessing a first quality level of each quality characteristic of a first set of quality characteristics required of the CA by the RP, said CA being a member of a Public Key Infrastructure (PKI) having a Certificate Policy (CP);

means for ascertaining a second quality level of each quality characteristic of a second set of quality characteristics possessed by the CA, each ascertained quality characteristic of the second set corresponding to an accessed quality characteristic of the first set on a one-to-one basis, at least one quality characteristic of the second set relating to at least one element of the CP;

means for comparing the ascertained second quality level of each quality characteristic of the second set with the accessed quality level of each corresponding quality characteristic of the first set; and means for communicating a first result of said comparing to the RP, said first result being that the certificate is authenticated if said comparing has determined that each first quality level is not less than each corresponding second quality level, otherwise said first result being that the certificate is not authenticated, said accessing, ascertaining, comparing, and communicating being performed by a certificate classification service;

wherein the second quality level of the quality characteristics of the second set comprise an assurance level with respect to an authenticity of the certificate, an assurance level with respect to guarding against a fake signature on the certificate, a credit rating of the CA, and parameters relating to; a Certification Practice Statement (CPS) describing how the requirements of the CP are met in practice; a trust model defining how the CA relates to other CAs within the PKI that the CA is a member of and to CAs who are members of other PKIs; formal agreements that regulate relationships between the CA and other actors such that the other actors include customers of the CA for whom the CA issues certificates, Registration Authorities (RA) used by the CA, and at least one other CA; and use of a Certificate Revocation List (CRL); and wherein the at least one element of the CP to which the at least one quality characteristic of the second set is related comprises; allowed or intended application areas for certificates issued by the CA; liabilities and responsibilities of the CA and of the customers of the CA; a legal environment and jurisdiction in which the CA operates; priyacy statements used by the CA; economical conditions pertaining to the CA; internal control mechanisms or third party audit procedures to verify that the CA's operation is in accordance with the CP, the CPS, and internal procedure descriptions; requirements and procedures for identification and authentication in connection with certificate issuing and naming by the CA; requirements and procedures and rules for certificate revocation by the CA; operational requirements for certificate issuing, revocation, logging procedures, archival, and key management by the CA; requirements for publishing for certificates, CRLs, and other information; disaster recovery plans for the CA; procedures for termination of the CA's service or transfer of the CA's service to another CA; physical, loaical, and administrative security related to operation of the CA's service; technical security measures used by the CA relating to generation, storage, and destruction of private keys and public keys; and an extent of compliance of the CA with the at least one element of the CP.

8. The system of claim 7, wherein said means for communicating further comprises means for communicating a second result of said comparing to the RP, wherein the second result is a list of deviations between the determined second quality level of each quality characteristic of the second and the accessed quality level of each corresponding quality characteristic of the first set.

9. The system of claim 7, wherein said means for accessing comprises means for obtaining the first quality level of each quality characteristic of the first set of quality characteristics from a certificate profile register of the certificate classification service.

10. The system of claim 7, wherein said means for accessing comprises means for receiving the first quality level of each quality characteristic of the first set of quality characteristics from the RP in conjunction with said request.

11. The system of claim 7, wherein said means for accessing, means for ascertaining, means for comparing, and means for communicating are implemented through execution of software code on a computer.

12. A computer program product, comprising software code loadable into an internal memory of a digital computer, said software code when executed on the computer performs a method for authentication of a public key certificate as a service to a relying party (RP) in response to a request for said authentication by the RP who desires to determine a level of trust in a Certificate Authority (CA) that issued the certificate, said method comprising:

accessing a first quality level of each quality characteristic of a first set of quality characteristics required of the CA by the RP, said CA being a member of a Public Key Infrastructure (PKI) having a Certificate Policy (CP);

ascertaining a second quality level of each quality characteristic of a second set of quality characteristics possessed by the CA, each ascertained quality characteristic of the second set corresponding to an accessed quality characteristic of the first set on a one-to-one basis, at least one quality characteristic of the second set relating to at least one element of the CP;

comparing the ascertained second quality level of each quality characteristic of the second set with the accessed quality level of each corresponding quality characteristic of the first set; and communicating a first result of said comparing to the RP, said first result being that the certificate is authenticated if said comparing has determined that each first quality level is not less than each corresponding second quality level, otherwise said first result being that the certificate is not authenticated, said accessing, ascertaining, comparing, and communicating being performed by a certificate classification service;

wherein the second quality level of the quality characteristics of the second set comprise an assurance level with respect to an authenticity of the certificate, an assurance level with respect to guarding against a fake signature on the certificate, a credit rating of the CA, and parameters relating to; a Certification Practice Statement (CPS) describing how the requirements of the CP are met in practice; a trust model defining how the CA relates to other CAs within the PKI that the CA is a member of and to CAs who are members of other PKIs; formal agreements that regulate relationships between the CA and other actors such that the other actors include customers of the CA for whom the CA issues certificates, Registration Authorities (RA) used by the CA, and at least one other CA; and use of a Certificate Revocation List (CRL); and wherein the at least one element of the CP to which the at least one quality characteristic of the second set is related comprises; allowed or intended application areas for certificates issued by the CA; liabilities and responsibilities of the CA and of the customers of the CA; a legal environment and jurisdiction in which the CA operates; privacy statements used by the CA; economical conditions pertaining to the CA; internal control mechanisms or third party audit procedures to verify that the CA's operation is in accordance with the CP, the CPS, and internal procedure descriptions; requirements and procedures for identification and authentication in connection with certificate issuing and naming by the CA; requirements and procedures and rules for certificate revocation by the CA; operational requirements for certificate issuing, revocation, logging procedures, archival, and key management by the CA; requirements for publishing for certificates, CRLs, and other information; disaster recovery plans for the CA; procedures for termination of the CA's service or transfer of the CA's service to another CA; physical, logical, and administrative security related to operation of the CA's service; technical security measures used by the CA relating to generation, storage, and destruction of private keys and public keys; and an extent of compliance of the CA with the at least one element of the CP.

13. The computer program product of claim 12, wherein said communicating further comprises communicating a second result of said comparing to the RP, wherein the second result is a list of deviations between the determined second quality level of each quality characteristic of the second and the accessed quality level of each corresponding quality characteristic of the first set.

14. The computer program product of claim 12, wherein said accessing comprises obtaining the first quality level of each quality characteristic of the first set of quality characteristics from a certificate profile register of the certificate classification service.

15. The computer program product of claim 12, wherein said accessing comprises receiving the first quality level of each quality characteristic of the first set of quality characteristics from the RP in conjunction with said request.

* * * * *